United States Patent [19]

Heiligman

[11] Patent Number: 5,318,703
[45] Date of Patent: Jun. 7, 1994

[54] WATER FILTER MODULE

[75] Inventor: Randy B. Heiligman, Minnetonka, Minn.

[73] Assignee: UltraPure Systems, Inc., Minneapolis, Minn.

[21] Appl. No.: 67,120

[22] Filed: May 26, 1993

[51] Int. Cl.[5] ............... B01D 27/02; B01D 29/085
[52] U.S. Cl. .................... 210/264; 210/266; 210/282; 210/283; 210/497.3
[58] Field of Search ............... 210/263, 264, 266, 282, 210/283, 473, 474, 477, 482, 488, 489, 495, 497.01, 499, 497.3

[56] References Cited

U.S. PATENT DOCUMENTS

| | | | |
|---|---|---|---|
| 3,304,852 | 2/1967 | Lande | 99/319 |
| 3,420,675 | 1/1969 | Costas | 99/77.1 |
| 3,971,305 | 7/1976 | Daswick | 99/295 |
| 4,080,299 | 3/1978 | Bartolome | 210/479 |
| 4,528,095 | 7/1985 | Byrne | 210/206 |
| 4,764,274 | 8/1988 | Miller | 210/232 |
| 4,826,594 | 5/1989 | Sedman | 210/282 |
| 4,826,695 | 5/1989 | Tanner | 426/77 |
| 4,859,348 | 8/1989 | Jusaitis et al. | 210/799 |
| 4,867,875 | 9/1989 | Peranio | 210/186 |
| 4,867,880 | 9/1989 | Pelle et al. | 210/474 |
| 4,963,262 | 10/1990 | Johnstone | 210/474 |
| 4,995,975 | 2/1991 | Jacquot et al. | 210/282 |
| 4,999,109 | 3/1991 | Saure | 210/474 |
| 5,076,912 | 12/1991 | Belz et al. | 210/264 |

*Primary Examiner*—Robert A. Dawson
*Assistant Examiner*—W. L. Walker
*Attorney, Agent, or Firm*—Kinney & Lange

[57] ABSTRACT

Water filter module for filtration of water used to brew coffee, having a series of vertically aligned filters placed in a body member and having a charcoal filtration member bounded by screen at its upper and lower ends and in the water filter module.

12 Claims, 3 Drawing Sheets

WATER FILTER MODULE

BACKGROUND OF THE INVENTION

1. Field of the Invention

The present invention pertains to a filter system, and more particularly, pertains to a water filtration system for filtering of water used in the brewing of coffee through a series of filtration devices, one of which is a layer of carbon granules.

2. Description of the Prior Art

Traditional coffee making systems have incorporated elaborate systems for the brewing of coffee and to extract the most desirable brew of coffee, only to have these efforts thwarted by using tap water, the likes of which imparts the taste of impurities contained in the brewing water to the brewed coffee, such to the dislike of the consumer. Most municipalities use chlorine to treat and disinfect their water supply. Chlorine reacts adversely with the water leaving it with a chlorine taste and odor. As a chemical the free chlorine reacts with the coffee grinds to adversely affect the taste of brewed coffee.

The present invention provides a filtration system for removing undesirable impurities found in the water used to brew coffee. The filter module removes residual chlorine, odors, foul tastes, impurities and any other sediments found in a water supply prior to the water coming in contact with the coffee grinds. The present invention is used with drip type coffee makers. Hot water drips into the water filter module, which sits upon the coffee grinds in the coffee grind basket. Water is filtered through the granules of carbon and mesh screens and then exits from the bottom of the invention entering into the coffee grinds. The filter module can also be used for filtration of water for use in tea or other consumable liquids.

SUMMARY OF THE INVENTION

The present invention pertains to a water filtration module used to filter coffee brewing water having a body which supports a flared inlet port which channels plain brewing water through a coarse filter and then through a series of finer filters finally to exit through a bottom member onto ground coffee in the upper regions of a coffee brewing device. The water filtration module can be placed in existing drip coffee brewing devices.

According to one embodiment of the present invention, there is provided a body member having a cylindrical or other shape of body and contained chamber into which an upper filtration screen, a layer of carbon granules, a lower filtration screen and a bottom member to fit, align and secure to the body member. An integral flared member extends above the cylindrical body and a holed planar member common to both the cylindrical body and the extending flared member.

One significant aspect and feature of the present invention is a water filter module having a flared or other shaped member for receiving of unfiltered water.

Another significant aspect and feature of the present invention is a water filtration module having a multiple filtration system.

Another significant aspect and feature of the present invention is a water filtration module having a carbon granule filter.

Having thus described one embodiment of the present invention, it is the principal object hereof to provide a water filter module for a coffee brewer for complete filtration of water used to brew coffee.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION EMBODIMENTS

Figure 1:
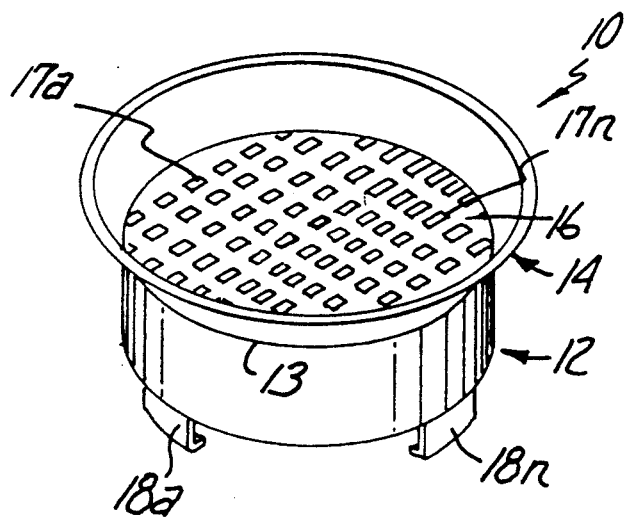
FIG. 1 illustrates a perspective view of the water filter module, the present invention.
Figure 2:
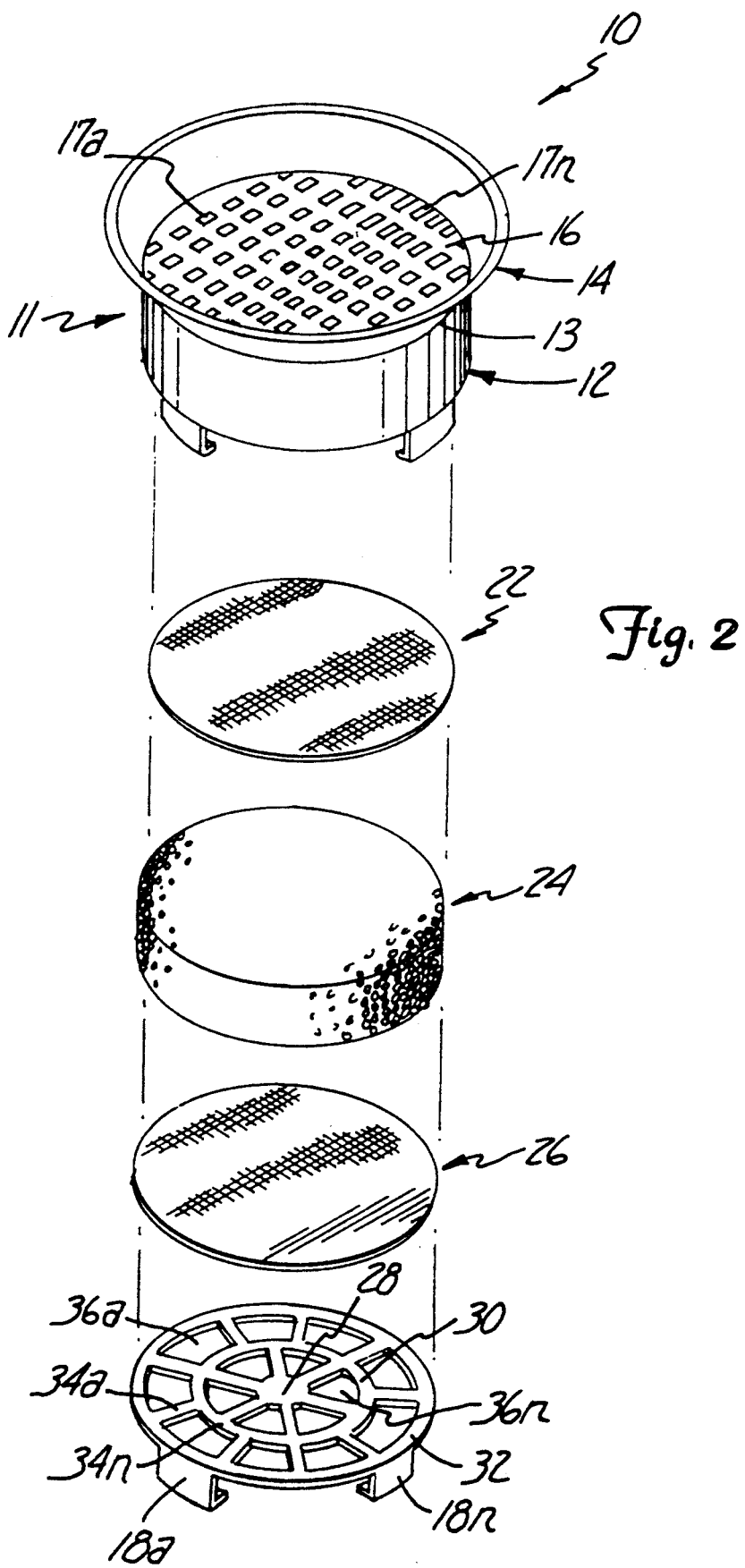
FIG. 2 illustrates an exploded view of the water filter module.

FIG. 1 illustrates a water filter module 10 for filtering of impurities from water used in a coffee brewing device. The water filter module 10 includes filtering devices aligned about the interior of the externally visible members as illustrated in the figures that follow. The water filter module 10 includes a polymer body 11 having a cylindrical shaped member 12, an edge 13, a flared annular lip 14 extending from the upper region of the cylindrical shaped member 12, an integral planar member 16 having a plurality of small holes 17a–17n aligned at the inner intersection of the cylindrical shaped member 12 and the flared annular lip 14, and a plurality of support feet 18a–18n extending from a polymer bottom member 20 as illustrated in FIG. 2.

FIG, 2 illustrates an exploded view of the water filter module 10 including the main polymer body member 11, an upper mesh screen 22, carbon granules 24, a lower screen 26 and a polymer bottom member 20 having a plurality of support feet 18a–18n extending downwardly therefrom. The upper mesh screen 22 and the lower mesh screen 26, in conjunction with the cylindrical shaped member 12, encapsulates the carbon granules 24 within the confines of the polymer body 11. The carbon granules can be of an appropriate size in a range of $20 \times 100$ mesh size, such as sold by Westvaco. The polymer bottom member 20 being essentially planar includes a round center member 28, ring members 30 and 32 concentric to the round center 28, a plurality of spoke members 34a–34n connecting the center member 28 to ring members 30 and 32, and a plurality of voids 36a–36n between the intersecting center member 28, ring members 30 and 32 and spoke members 34a–34n. The screens 22 and 26 can be a suitable polymer mesh material of a fine mesh size to filter out small particles or impurities.

Figure 3:
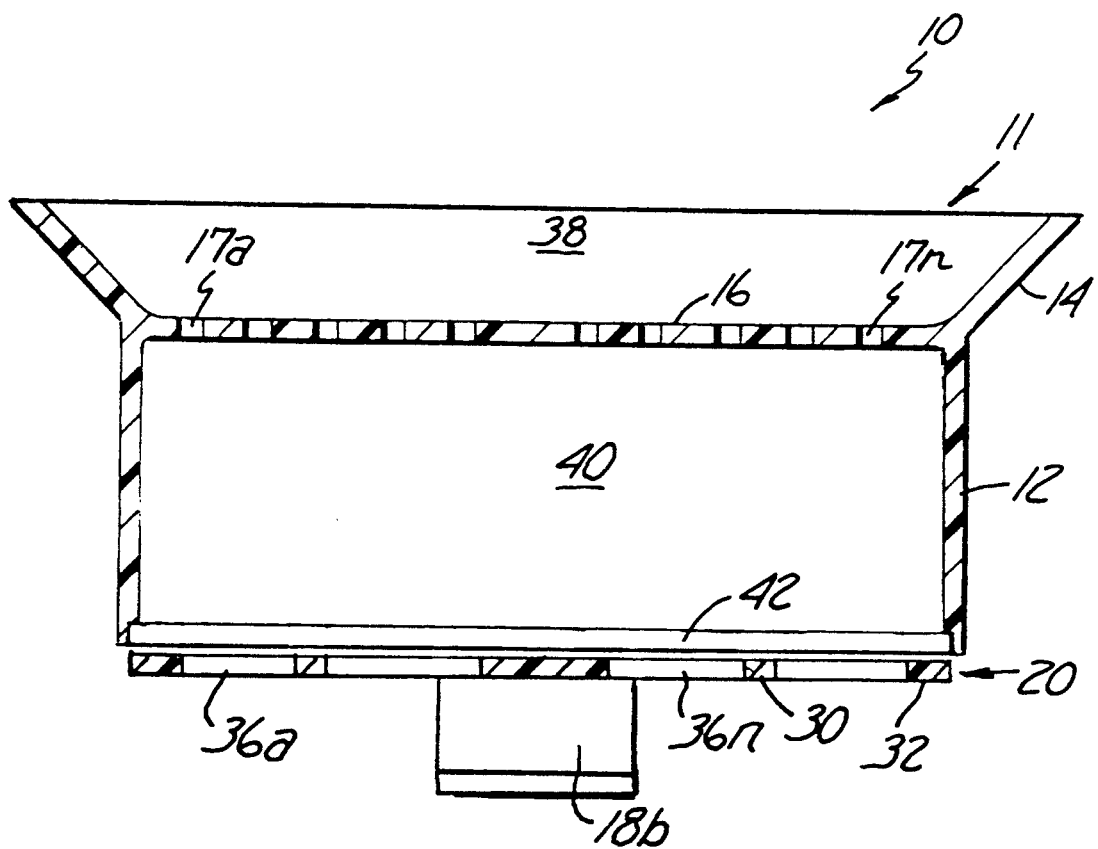
FIG. 3 illustrates a cross-sectional view of the body and bottom of the water filter module; and, FIG. 4 illustrates a cross-sectional view of an assembled water filter module.

FIG. 3 illustrates a cross section of the polymer body 11 where all numerals correspond to those elements previously described. A receiving chamber or port 38 is formed by the planar member 16 and the intersecting flared annular lip 14 to receive water for filtration as described later in detail. A chamber 40 is formed by the under surface of the planar member 16, the cylindrical body 12 and the polymer bottom member 20. The chamber 40 accommodates the upper and lower screens 22 and 26 and the carbon granules 24 described in FIG. 2. An annular groove 42 about the lower edge of the cylindrical ember 12 of the polymer body 11 accommodates a portion on the outer ring 32 of the polymer bottom member 20 and is suitably secured therein, such as by ultrasonic welding, adhesives or any other suitable securing process. In an alternative embodiment, the bottom member can be molded integral to the body, and the top planar mesh member can be dropped in and secured to the body once the screens and the carbon block are inserted.

Figure 4:
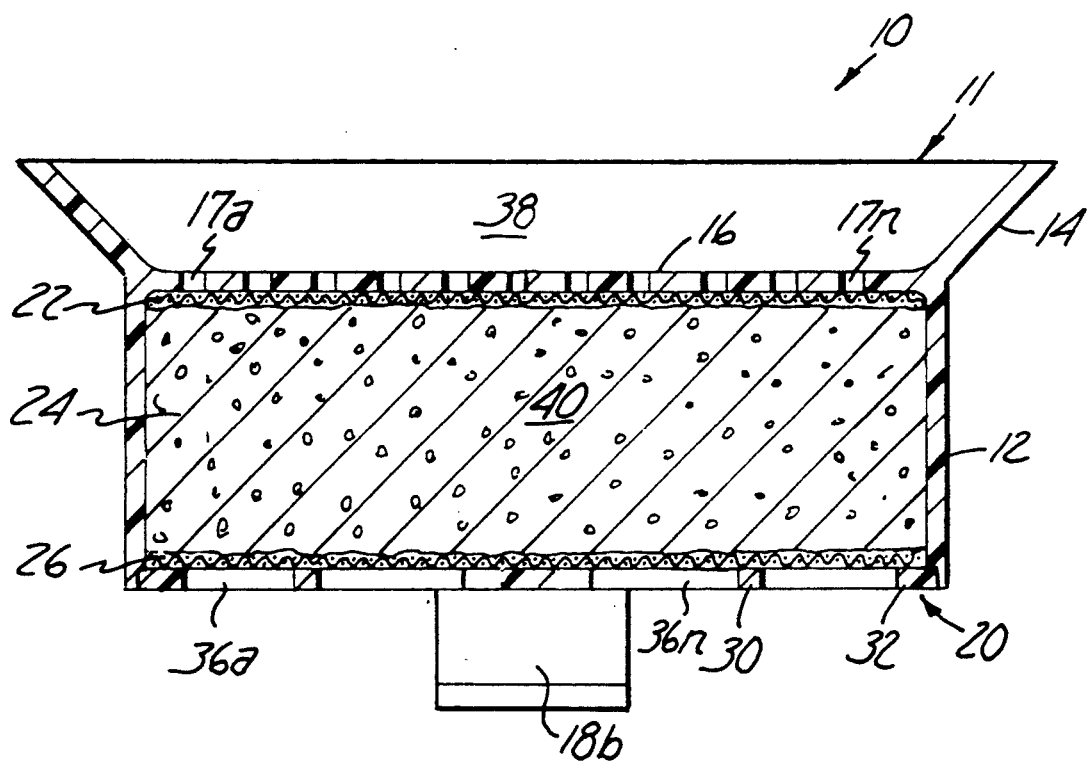

FIG. 4 illustrates the assembled water filter module 10 where all numerals correspond to those elements previously described. The water filter module 10 is assembled by affixing the upper screen member 22 within the chamber 40 and to the underside of the holed planar member 16, such as by ultrasonic welding or other suitable means. The carbon granules 40 are then placed in the chamber 40 against the upper screen 22. Finally, the polymer bottom member 20, having the lower screen 26 suitably attaches to the upper surface of the polymer bottom member 20, such as by ultrasonic welding, is brought into the chamber 40 to bear against the carbon granules 24 and, at the same time, is aligned with the annular groove 42 in the lower inner edge of the cylindrical body 12 and suitably secured thereto as previously described. The upper and lower screens 22 and 26, as well as providing filtration, also serve the function of containing the carbon granules within the chamber 40.

MODE OF OPERATION

FIG. 4 best illustrates the mode of operation of the water filter module 10. The water filter module 10 is placed with its support feet on top of a mound of ground coffee beans or ground coffee awaiting the brewing process. Water is then introduced into the receiving chamber or port 38 from a suitable source and is introduced by the plurality of holes 17a-17n in the planar member 16, into the upper screen 22, which filters out any other large impurities or other undesirable material. If desired, polymer filter media common to this art can also be inserted into the receiving chamber 38 and sonically welded to provide mechanical filtration to remove sediment and other dirt particles. After this coarse filtering through the upper screen 22, the water is filtered through the carbon granules 24 and the lower screen 26. After this thorough filtration through the chamber 40, the filtered water passes through the voids 36a-36n in the polymer bottom member 20 and onto a mound of ground coffee awaiting the brewing process in the upper region of a coffee brewing device.

Various modifications can be made to the present invention without departing from the apparent scope hereof.

I claim:

1. A water filter for positioning between a source of hot water and ground coffee beans to filter impurities from the hot water used in coffee brewing, the water filter comprising:
    a filter housing defining a chamber, the cylindrical filter housing having an upper edge and a lower edge, a flared annular lip extending upwardly and outwardly from the upper edge to define a funnel above the chamber for receiving and preventing overflow of the hot water, and a first planar horizontal mesh member extending across the upper edge to separate the funnel from the chamber;
    a first mesh screen positioned within the chamber and adjacent to the horizontal mesh member,
    loose carbon granules within the chamber below the first mesh screen;
    a second mesh screen positioned within the chamber below the loose carbon granules so that the loose carbon granules are contained within the chamber between the first mesh screen and the second mesh screen; and
    a bottom member positioned adjacent the second screen for engaging the filter housing adjacent to the lower edge thereof to close the filter housing with the first mesh screen, loose carbon granules, and the second mesh screen contained therein, the bottom member including a plurality of spoke members for supporting the second mesh screen wherein each of the plurality of spoke members extends outward from a center hub to the filter housing adjacent the lower edge thereof.

2. The water filter as in claim 1, wherein the first mesh screen in made of a polymer material.

3. The water filter as in claim 1, wherein the second mesh screen is made of a polymer material.

4. The water filter as in claim 1, wherein the loose carbon granules are approximately 20×100 mesh size.

5. The water filter as in claim 1, wherein the bottom member further includes a plurality of support feet extending downwardly from the bottom member for engaging the ground coffee and for supporting the filter housing above the ground coffee.

6. The water filter as in claim 1, wherein the bottom member further includes an intermediate ring member positioned between the center hub and the lower edge of the filter housing.

7. The water filter as in claim 1, further comprising a ring member integrally formed to the plurality of spoke members and positioned between the center hub and the lower edge of the filter housing.

8. A water filter for positioning between a source of hot water and ground coffee beans to filter impurities from the hot water for making coffee, the water filter comprising:
    a cylindrical filter housing defining a chamber, the cylindrical filter housing having an upper edge and a lower edge, and a flared annular lip extending upwardly and outwardly from the upper edge to define a funnel above the chamber for receiving and preventing overflow of the hot water;
    a first filter medium positioned adjacent to the upper edge for filtering impurities from the hot water received from the funnel;
    loose carbon granules within the chamber below the first filter medium for filtering impurities from the hot water passing through the first filter medium;
    a second filter medium positioned within the chamber below the loose carbon granules so that the loose carbon granules are contained within the chamber between the first filter medium and the second filter medium;
    a bottom member positioned below the second filter medium for engaging the filter housing adjacent to the lower edge thereof to close the filter housing with the first filter medium, loose carbon granules, and the second filter medium contained therein; and
    a plurality of spoke members positioned adjacent to the second filter medium for supporting the second filter medium, wherein each of the plurality of spoke members extends outward from a center hub to the filter housing adjacent the lower edge thereof.

9. The water filter as in claim 8, wherein the first filter medium is a mesh screen.

10. The water filter as in claim 8, wherein the second filter medium is a mesh screen.

11. The water filter as in claim 8, wherein the loose carbon granules are approximately 20×100 mesh size.

12. The water filter as in claim 8, wherein there is provided a plurality of support feet extending downwardly from a periphery of the bottom member.

* * * * *

UNITED STATES PATENT AND TRADEMARK OFFICE
CERTIFICATE OF CORRECTION

PATENT NO. : 5,318,703

DATED : June 7, 1994

INVENTOR(S) : RANDY B. HEILIGMAN

It is certified that error appears in the above-indentified patent and that said Letters Patent is hereby corrected as shown below:

Col. 2, line 4, delete "D WINGS", insert --DRAWINGS--

Col. 2, line 22, after "DETAILED DESCRIPTION", insert --OF THE PREFERRED--

Col. 3, line 61, delete "a filter", insert -- a cylindrical filter--

Signed and Sealed this

Thirty-first Day of January, 1995

*Attest:*

BRUCE LEHMAN

*Attesting Officer*   *Commissioner of Patents and Trademarks*